(12) United States Patent
Treatch

(10) Patent No.: US 9,712,212 B2
(45) Date of Patent: Jul. 18, 2017

(54) MULTIPLE SERVICE DISTRIBUTED-ANTENNA SYSTEM

(71) Applicant: WLanJV, Inc., Dallas, TX (US)

(72) Inventor: James Treatch, Dallas, TX (US)

(73) Assignee: WLanJV, Inc., Dallas, TX (US)

( * ) Notice: Subject to any disclaimer, the term of this patent is extended or adjusted under 35 U.S.C. 154(b) by 0 days.

(21) Appl. No.: 15/084,673

(22) Filed: Mar. 30, 2016

(65) Prior Publication Data

US 2016/0294450 A1    Oct. 6, 2016

Related U.S. Application Data

(60) Provisional application No. 62/142,539, filed on Apr. 3, 2015.

(51) Int. Cl.
| | | |
|---|---|---|
| *H04W 16/22* | (2009.01) | |
| *H04B 7/022* | (2017.01) | |
| *H04W 24/08* | (2009.01) | |
| *H04B 5/00* | (2006.01) | |
| *H04W 84/12* | (2009.01) | |

(52) U.S. Cl.
CPC .......... *H04B 7/022* (2013.01); *H04B 5/0018* (2013.01); *H04W 24/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,018,165 A | | 5/1991 | Sohner et al. |
| 5,025,452 A | * | 6/1991 | Sohner ................ H04B 5/0018 375/130 |
| 5,465,395 A | | 11/1995 | Bartram |
| 5,467,066 A | | 11/1995 | Schulze-Buxloh |
| 6,980,768 B2 | | 12/2005 | Arend et al. |
| 7,499,672 B2 | | 3/2009 | Matsushita |
| 7,570,615 B2 | | 8/2009 | Bolin et al. |
| 7,583,855 B2 | | 9/2009 | Dundar et al. |
| 8,055,300 B2 | | 11/2011 | Andersson et al. |
| 8,078,214 B2 | | 12/2011 | Yaginuma et al. |

(Continued)

FOREIGN PATENT DOCUMENTS

| | | |
|---|---|---|
| JP | 2006080782 A | 3/2006 |
| WO | 2242338 A | 9/1991 |

(Continued)

OTHER PUBLICATIONS

Hiltunen, Kimmo, Using Distributed Antenna Systems to Extend WLAN Coverage, S-72.333, Post graduate Course in Radio Communications 2003-2004, Aalto University, Espoo, Finland.

*Primary Examiner* — Fan Ng
(74) *Attorney, Agent, or Firm* — John A. Thomas

(57) ABSTRACT

A distributed-antenna system is disclosed. The system has a least one leaky feeder, a plurality of RF signal sources, at least one data router providing IP addressing and data control to the RF signal sources (which may be data-controlled radios), and a plurality of RF filters connected between the respective RF signal sources and the leaky feeder and connecting the respective RF signal sources to the leaky feeder. The RF signal sources are distributed along the leaky feeder to optimize both spectrum use and coverage of predetermined areas in, for example, office or apartment buildings.

17 Claims, 2 Drawing Sheets

(56) References Cited

U.S. PATENT DOCUMENTS

Figure 1:
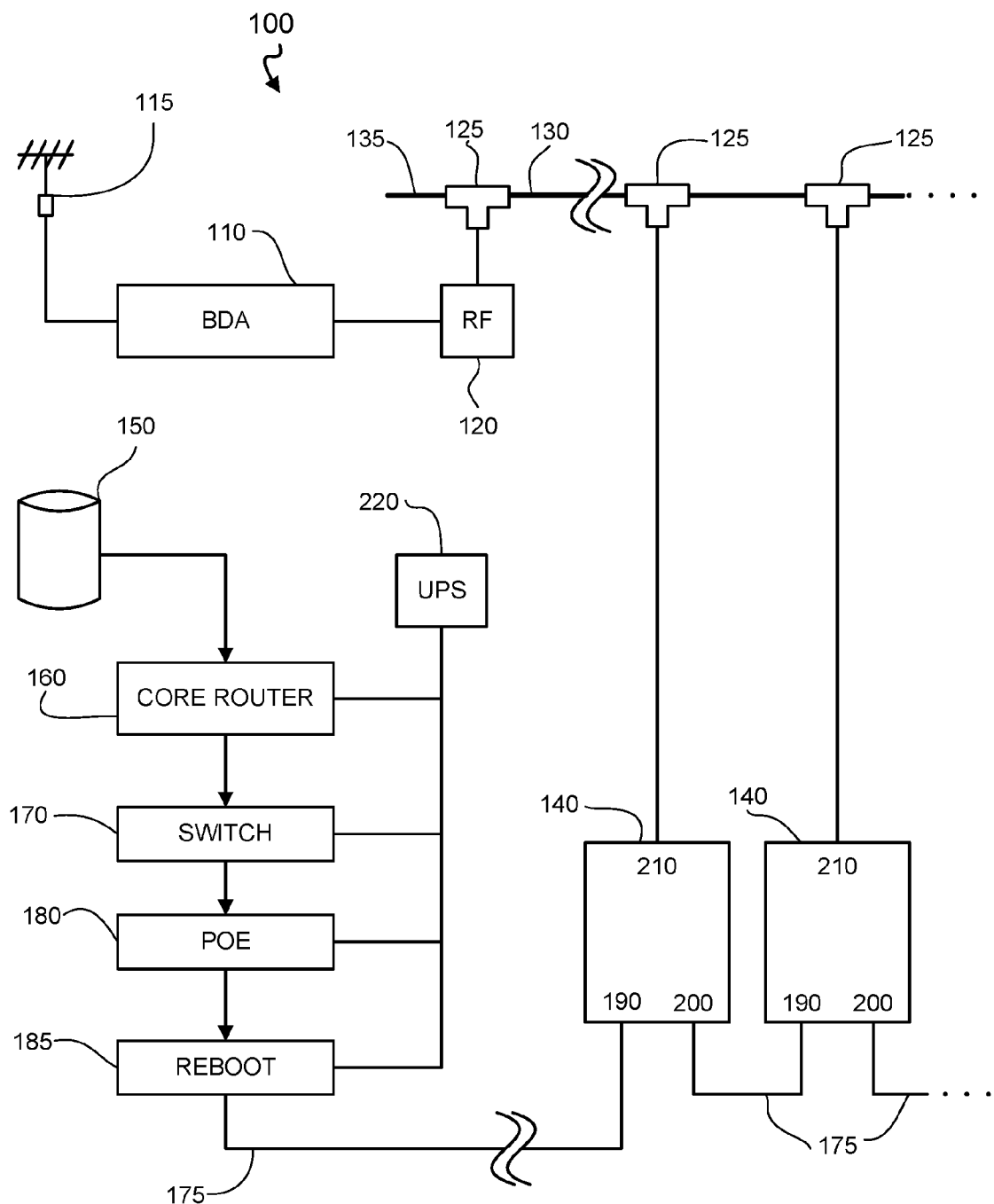

| | | | |
|---|---|---|---|
| 8,452,240 B2 | 5/2013 | Takahashi | |
| 8,489,015 B2 | 7/2013 | Becker | |
| 8,725,188 B1 | 5/2014 | Murphy et al. | |
| 8,811,278 B2 | 8/2014 | Takei et al. | |
| 9,397,722 B1* | 7/2016 | Sternowski | H04B 1/40 |
| 2006/0087443 A1* | 4/2006 | Frederick | E21C 35/24 |
| | | | 340/686.6 |
| 2007/0099667 A1 | 5/2007 | Graham et al. | |
| 2007/0225019 A1* | 9/2007 | Knox | H04L 45/56 |
| | | | 455/461 |
| 2009/0197531 A1 | 8/2009 | Locke et al. | |
| 2010/0054227 A1 | 3/2010 | Hettstedt | |
| 2010/0215028 A1 | 8/2010 | Fischer | |
| 2010/0238029 A1* | 9/2010 | Inomata | G08B 29/26 |
| | | | 340/552 |
| 2011/0234338 A1 | 9/2011 | Takahashi | |
| 2011/0268446 A1 | 11/2011 | Cune | |
| 2012/0009939 A1* | 1/2012 | Islam | G01S 5/0036 |
| | | | 455/456.1 |
| 2012/0275351 A1 | 11/2012 | Ailas | |
| 2013/0093638 A1 | 4/2013 | Shoemaker | |
| 2013/0288592 A1 | 10/2013 | Ben-Tolila | |
| 2014/0269318 A1 | 9/2014 | Hasarchi et al. | |
| 2015/0023444 A1 | 1/2015 | Tarlazzi et al. | |
| 2015/0208249 A1* | 7/2015 | Werner | H04L 12/2838 |
| | | | 455/14 |
| 2016/0112095 A1* | 4/2016 | Derneryd | H01Q 1/007 |
| | | | 375/257 |
| 2016/0323018 A1* | 11/2016 | Nilsson | H01Q 1/007 |

FOREIGN PATENT DOCUMENTS

| | | | |
|---|---|---|---|
| WO | 2012156276 A1 | 11/2012 | |
| WO | 2013017175 A1 | 2/2013 | |

\* cited by examiner

MULTIPLE SERVICE DISTRIBUTED-ANTENNA SYSTEM

CLAIM FOR PRIORITY

This application claims the priority of U.S. Provisional Patent Application Ser. No. 62/142,539, and filing date Apr. 3, 2015, which application is incorporated in its entirety by reference into the present application.

BACKGROUND

Technical Field

This disclosure concerns the implementation of distributed-antenna systems providing multiple services, such as cellular telephone voice and data, Wi-Fi, broadband internet service, low-power TV and others.

Background

The wireless local area network (WLAN) market is rapidly growing, and the variety of hotspots targeted for implementation is considerable. A "hotspot" is a physical location that offers Internet access over a WLAN through the use of a router connected to a link to an Internet service provider. Hotspots typically use Wi-Fi technology. Many of the hotspots targeted are large and achieving good coverage may be challenging. The current standard for providing coverage is to distribute individual WLAN access points (APs) in the target area. The number of APs needed by using this method may become significant. For example, up to 5000 APs can be required to provide coverage in a facility such as an airport. Today, it is estimated that 80% percent of all mobile voice and data connections occur indoor, so the problem of providing connection to WLAN and other services is only growing.

A distributed-antenna system (DAS) is the infrastructure used to distribute radio signals from one or more radio base stations and radio access points to any number of antennas located throughout the wanted coverage area. The coverage area may be covered by one or more cells, where each cell is typically served by any number of antennas multi-casting the same signal.

The DAS is the most effective and most flexible method to provide coverage inside a building. A DAS allows better control of the service area borders of the in-building system. At the same time, it provides high-quality coverage and low interference compared with using base stations and access points with integrated antennas. In addition, the DAS provides better radio trunking efficiency by allowing larger portions of the building to be served by a single cell or access point. This makes the frequency planning easier since fewer channels are needed to support the in-building traffic, which results in higher capacity with less interference.

An array of antennas distributed via a coaxial feeder network (passive DAS) is currently the most popular antenna configuration for cellular in-building solutions. The typical passive DAS comprises antennas, regenerators, power splitters and tappers, feeder cables, connectors and jumper cables. The disadvantage of a coaxial distributed-antenna network is that in a typical network, the coaxial cabling uses between 20 and 30 dB of the link budget. This results in the need of relatively high power at the base station antenna connector and the resulting high cost of the power amplifier. The possibly large cable loss puts also a limit to the WLAN deployment.

Radiating cable is an alternative to distributed-antennas in many applications, such as large apartment or office buildings or tunnels. A radiating cable (also called "leaky cable," or "leaky feeder" in this disclosure) is a modified coaxial cable with slots in the outer conductor, which allows a controlled part of the RF signal to leak out of the cable, and also allows external RF signals to be coupled into the cable. In this disclosure, the terms "radiating cable", "leaky cable", or "leaky feeder" can also refer to any RF transmission medium now known or hereafter developed that is capable of efficiently radiating and receiving RF radiation with a coupling loss less than about 80 dB. Thus, the cable works as a continuous antenna and can be placed everywhere coverage is needed. Current distributed-antenna systems, with or without radiating cable, do not satisfactorily address problems of multi-band operations (e.g., cellular voice and data, Wi-Fi, HD TV, low-power TV, and public safety radio, among others) on the same antenna, problems with optimizing signal power in different bands, difficulties with filtering, and implementation of data networks that could allow individual subscriber access to speed control.

What is needed is a system that solves the problem of RF indoor coverage in a broad range of frequencies with the same distributed-antenna system. The solution should optimize both spectrum use and coverage of closed environments such as offices or apartment buildings. A desirable such system should comprise modules that can be pre-assembled and configured on-site to speed installation time and lower costs. The leaky cable of such a distributed-antenna system can be installed during new building construction, and data-controlled RF injection modules can be configured and installed as required, including accepting updates as new technologies offering new services evolve and thus "future proofed."

DRAWINGS

Non-limiting embodiments of the present disclosure are described by way of example in the accompanying drawings, which are schematic and are not intended to be drawn to scale.

Figure 2:
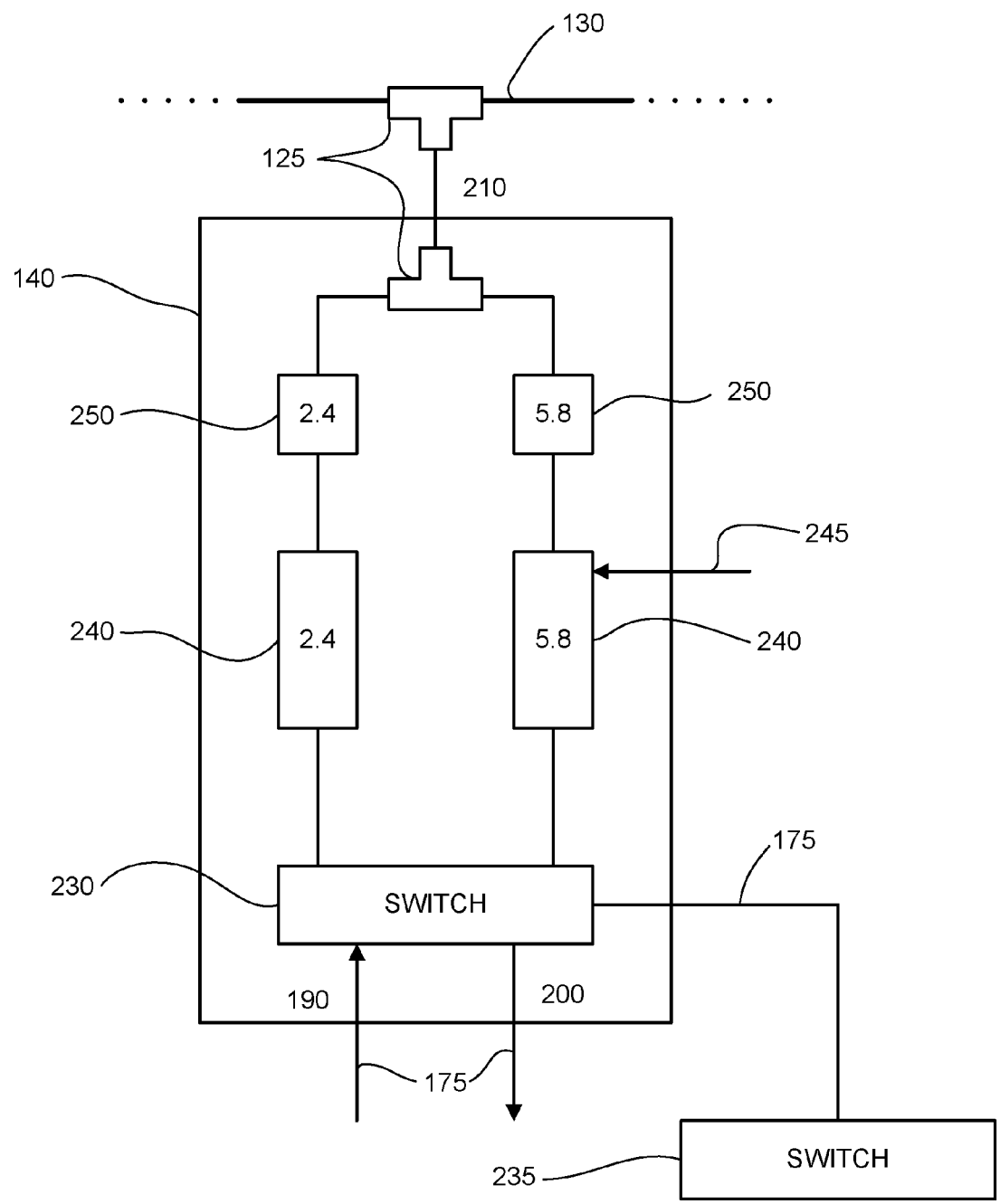

FIG. 1 is a schematic connection diagram showing basic elements contributing to an embodiment of the claimed distributed-antenna system FIG. 2 is a schematic connection diagram showing an example module of an embodiment of the claimed distributed-antenna system.

DETAILED DESCRIPTION

FIG. 1 shows a simplified connection schematic of an embodiment of the distributed-antenna system 100. Firstly, an RF telecom signal source comprising a bi-directional amplifier (BDA) 110 is shown connected to an external antenna 115 to receive signals from remote cellular-radio transmissions. The output of the BDA 110 is coupled through appropriate RF filters 120 to the leaky cable 130 of the system, preferably at the head end 135 of the leaky cable 130. The BDA 110 of course receives signals from the leaky cable 130 and re-transmits such signals to the external cellular-radio antenna 115. In each case of a connection to the leaky cable 130, such connection is made through a representative RF combiner 125, as depicted in the figures. In the art, a BDA 110 may be referred to as a "repeater." In practice, cellular telecom services in the range of 700 MHz to 2170 MHz could be injected by the BDA 110 into the leaky cable 130, with the signal power levels of such signals adjusted to be radiated throughout the leaky cable 130 until its termination.

The reader should understand that a BDA 110 may operate with signals in other bands than the cellular telecom region to connect those signals to the leaky feeder, and this disclosure is not limited to a BDA 110 operating in the cellular telecom region, but may include operation at frequencies between about 100 MHz and about 6 GHz, for example, US public-safety frequencies in the 700-800 MHz band.

The presence or absence of such an RF telecom signal source (or other similar signal source) comprising a BDA 110 in the distributed-antenna system 100 is optional, depending on the needs of a particular installation, but the feature illustrates the flexibility of the claimed distributed-antenna system 100.

FIG. 1 also shows data-controlled radio modules 140 connected to the leaky cable 130. (The details of the modules 140 are described further in the discussion below and in FIG. 2.) In this application, a "data-controlled radio" is a wireless radio, with features selectable by data inputs from an Ethernet connection. A data-controlled radio will have an Internet-Protocol (IP) address, and typically support power-over-Ethernet (POE). Thus data input to such a radio may modulate RF for further transmission, or demodulate RF for conversion to data signals, as well as provide control of the radio features and capabilities. A typical application would be transmitting and receiving RF using wireless protocols in the 2.4 GHz (Wi-Fi) and 5.8 GHz (wireless broadband) frequencies.

FIG. 1 shows a data source 150 connected through data lines 175 to a core router 160, which core router 160 is further connected through a data switch 170 and a POE injector 180. Although shown as a separate POE injector 180 in FIG. 1, the POE capability may be provided by a POE-enabled data switch, such as the data switch 170.

FIG. 1 also shows an optional IP-addressed power rebooter device 185 connected to the core router 160, which power rebooter device 185 has the capability to selectively re-boot AC power to any device connected to it as determined by data received at its IP address.

The switched data flow is connected through the data line 175 to one or more modules 140, which modules 140 may be daisy-chained together as shown, where a module 140 has an input 190 for data and POE, and an output 200 for data and POE. The data line 175 may be wire line or optical fiber, and preferably includes features supporting POE to power the daisy-chained modules 140. Further, each module 140 has an RF output connection 210 to the leaky cable 130 of the distributed-antenna system 100. Preferably, an uninterruptable power supply (UPS) 220 powers the data components.

The data source 150 comprises both data for control of the operation of the modules 140, as well as a data comprising digitized signals for conversion to RF and transmission on the leaky cable 130. Non-limiting examples of services that may be so provided are described in the table below. RF signals are injected into the leaky cable 130 at pre-determined intervals from the modules 140 as shown in FIG. 1, and as discussed in more detail below with reference to FIG. 2.

FIG. 2 illustrates a representative data-controlled radio module 140. The module depicted has a data input 190, a data output 200 (both input and output possibly being POE-enabled) connected to a module data switch 230. (FIG. 2 also shows how an optional second data switch 235 or switches may be further connected to the module data switch 230, where hard-wired Ethernet connectivity is desired and available.) The module data switch 230 is connected to and controls one or more data-controlled radios 240, shown in the figure, by example only, as operating at 2.4 GHz and 5.8 GHz. Each data-controlled radio 240 is further connected through RF filters 250 to a combiner 125, and thereafter, through the module RF output 210 to the leaky cable 130 of the distributed-antenna system 100. FIG. 2 shows that one or more of the data-controlled radios 240 may have an optional auxiliary RF input 245, from coaxial cable, for example.

As shown in FIG. 2 by example, 2.4 GHz Wi-Fi signals from the data-controlled radios 240 disposed in the modules 140 may be injected at approximately 100 meter intervals along the leaky cable 130 through RF filters 250 appropriate to the band of interest. The 2.4 GHz signal power levels should be set to radiate approximately 50 meters in both directions from each filtered data-controlled radio 240. The 2.4 GHz channels 3 and 9 in this example are alternated along the leaky cable 130 to get maximum capacity and minimum interference between access points. Suitable signal sources and RF filters are available on the market and described in more detail below.

In a further refinement, as shown in the description of the modules 140 and in FIG. 2, the RF signal sources 240 may also be 5.8 GHz broadband-internet data-controlled radios, having 20-40 MHz modulation, bandwidth-separated 10 MHz between adjacent 5.8 GHz access points. (In this disclosure, an "RF signal source" refers to a data-controlled radio, as described below, or a bi-directional amplifier, as the context requires). This embodiment demonstrates the spectrum efficiency and interference reduction benefit of distributed signal sources compared to amplifying and repeating the same signal from the head to the end of the leaky cable 130, using, for example, regeneration of signals.

The reader should note that the number of components of the claimed system is not limited to those shown in the drawings, and practical systems, may, for example, have more than one BDA 110, or data source 150, or, particularly, more than one module 140. Further, each module 140 may have more than two data-controlled radios 240, and this disclosure is not limited to the example shown in FIG. 2.

A suitable BDA 110 for many embodiments would be the model CM 5000, manufactured by SureCall of Fremont, Calif. A suitable core router 160 would be the model RB2011UiAS, manufactured by MikroTik SIA of Riga, Latvia. A suitable data switch 230 would be the model ProCurve 2626, manufactured by Hewlett Packard of Palo Alto, Calif. In the data-controlled radio modules 140, a suitable data-controlled radio 240 would be the model GrooveA 52HPn, manufactured by MikroTik SIA. Similar "small cell" data-controlled radios 240 offering IP data-to-RF translation include the model 3GE-16 manufactured by ip.access, Ltd. of Cambourne, Cambridge, United Kingdom and the model SCRN-310, manufactured by Spider Cloud Wireless of Milpitas, Calif. The reader should recognize that these particular enabling components are not necessarily required for implementation, and their mention here does not limit the scope of the claims.

The BDA (if present) and the core router 160, switch 170, and data-related components just described may be conveniently located in a physical head-end rack (not shown) at the building or facility where the distributed-antenna system 100 is deployed.

The following table lists examples of services that may be provided in the embodiments described in this disclosure; however, the list is not exhaustive, and provision of other services, now known or later developed, may be also be implemented through the same system, whereby the system may be said to be "future proofed":

Cellular 700 MHz long-term evolution (LTE) data, 800 MHz voice, 1900 MHz personal communication service (PCS), 2100 MHz AWS services.
HD TV, low-power TV, 600-700 MHz high definition digital television local low power TV services.
Wi-Fi 2.4 GHz Internet access hotspot services.
Broadband Internet 5.8 GHz high speed Internet services.
FM radio, translators 88-108 MHz services.
Voice-over-IP (VOIP) 2.4 GHz telephone access services.
Public Safety 150, 450, 800 MHz portable radio services.
Two-Way radio 150, 450, 800 MHz repeater services.
Enhanced-911 (E911) GPS 1100, 1500 MHz global positioning services.

The reader should note that the above described embodiments do not rely on signal regeneration, or the provision of regenerators along a distributed-antenna system. Rather, the embodiments described in this application comprise local signal source insertion devices (e.g., the data-controlled radio modules 140).

None of the description in this application should be read as implying that any particular element, step, or function is an essential element which must be included in the claim scope; the scope of patented subject matter is defined only by the allowed claims. Moreover, none of these claims are intended to invoke paragraph six of 35 U.S.C. Section 112 unless the exact words "means for" are used, followed by a gerund. The claims as filed are intended to be as comprehensive as possible, and no subject matter is intentionally relinquished, dedicated, or abandoned.

I claim:

1. A distributed-antenna system comprising:
at least one leaky feeder;
a plurality of RF signal sources;
where the plurality of RF signal sources comprises:
at least one first RF signal source for cellular telecom services connected to a respective at least one first RF filter at the head end of the leaky feeder; and,
a plurality of second RF signal sources for Wi-Fi services connected to a respective plurality of second RF filters; and,
the plurality of second RF filters connected to the leaky feeder at predetermined intervals;
at least one data router providing IP addressing and data control to one or more of the first and second RF signal sources;
a plurality of RF filters connected between the respective first and second RF signal sources and the leaky feeder, and connecting the respective first and second RF signal sources to the leaky feeder;
where the first and second RF signal sources are distributed along the leaky feeder to optimize both spectrum usage and coverage of predetermined areas; and,
where the plurality of second RF signal sources for Wi-Fi services are alternated along the leaky feeder according to different Wi-Fi channels to maximize capacity and minimize interference between the different Wi-Fi channels.

2. The distributed-antenna system of claim 1, where:
the plurality of first and second RF signal sources comprises at least one bi-directional amplifier and at least one data-controlled radio.

3. The distributed-antenna system of claim 1, where:
the plurality of first and second RF signal sources comprises:
at least one RF signal source for voice-over-IP connectivity to the public-switched telephone network.

4. The distributed-antenna system of claim 1,
where:
the plurality of first and second RF signal sources comprises one or more RF signal sources for 4G LTE services.

5. The distributed-antenna system of claim 1,
further comprising:
the plurality of first and second RF signal sources further comprising an RF signal source for two-way radio transmission; and,
a receiver for RF signals for two-way radio communications connected to the leaky feeder.

6. The distributed-antenna system of claim 5, where the two-way radio communications comprise public safety radio communications.

7. A distributed-antenna system comprising:
at least one leaky feeder;
a plurality of RF signal sources;
where the plurality of RF signal sources comprises:
RF signal sources for broadband internet services connected to a respective plurality of RF filters; and,
the plurality of RF filters connected to the RF signal sources for broadband internet services further connected to the leaky feeder at predetermined intervals;
at least one data router providing IP addressing and data control to one or more of the RF signal sources;
a plurality of RF filters connected between the respective RF signal sources and the leaky feeder, and connecting the respective RF signal sources to the leaky feeder;
where the plurality of RF signal sources are distributed along the leaky feeder to optimize both spectrum usage and coverage of predetermined areas; and,
where the plurality of RF signal sources for broadband internet services are connected at intervals along the leaky feeder to provide bandwidth separation of the plurality of RF signal sources for broadband internet services.

8. The distributed-antenna system of claim 7, where the connection of the plurality of RF signal sources at intervals along the leaky feeder comprises alternating the frequencies of the RF signal sources injected along the leaky feeder.

9. A distributed-antenna system comprising:
at least one leaky feeder;
a plurality of data-controlled radio modules; the data-controlled radio modules further comprising:
a plurality of RF signal sources;
where the plurality of RF signal sources further comprises data-controlled radios for Wi-Fi services;
at least one data router providing IP addressing and data control to one or more of the RF signal sources;
a plurality of RF filters connected between the respective RF signal sources and the leaky feeder, and connecting the respective RF signal sources to the leaky feeder;
where the data-controlled radio modules for Wi-Fi services are alternated along the leaky feeder according to different Wi-Fi channels to maximize capacity and minimize interference between the different Wi-Fi channels.

10. The distributed-antenna system of claim 9, where the data-controlled radio modules are daisy-chained together.

11. The distributed-antenna system of claim 9, where the data-controlled radio modules are powered by power-over-Ethernet connections.

12. The distributed-antenna system of claim 9, where one or more of the data-controlled radio modules supports an auxiliary RF input.

13. The distributed-antenna system of claim 9, where one or more of the data-controlled radio modules provides a data connection to an auxiliary data switch for wired Ethernet connections.

14. A distributed-antenna system comprising:
   at least one leaky feeder;
   a plurality of data-controlled radio modules; the data-controlled radio modules further comprising:
      a plurality of RF signal sources;
         where the plurality of RF signal sources further comprises data-controlled radios for broad-band internet services;
      at least one data router providing IP addressing and data control to one or more of the RF signal sources;
      a plurality of RF filters connected between the respective RF signal sources and the leaky feeder, and connecting the respective RF signal sources to the leaky feeder;
   the data-controlled radios for broadband internet services are connected at intervals along the leaky feeder to provide bandwidth separation of the plurality of RF signal sources for broadband internet services.

15. The distributed-antenna system of claim 14, where one or more of the data-controlled radio modules supports an auxiliary RF input.

16. The distributed-antenna system of claim 14, where one or more of the data-controlled radio modules provides a data connection to an auxiliary data switch for wired Ethernet connections.

17. The distributed-antenna system of claim 14, where the data-controlled radio modules are powered by power-over-Ethernet connections.

* * * * *